United States Patent
Meyerzon et al.

(10) Patent No.: US 10,628,497 B2
(45) Date of Patent: *Apr. 21, 2020

(54) DYNAMIC CONTENT SUGGESTION IN SPARSE TRAFFIC ENVIRONMENT

(71) Applicant: Microsoft Technology Licensing, LLC, Redmond, WA (US)

(72) Inventors: Dmitriy Meyerzon, Bellevue, WA (US); Yauhen Shnitko, Snohomish, WA (US); Sebastian Blohm, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,913

(22) Filed: Oct. 8, 2018

(65) Prior Publication Data

US 2019/0087421 A1 Mar. 21, 2019

Related U.S. Application Data

(63) Continuation of application No. 14/836,520, filed on Aug. 26, 2015, now Pat. No. 10,127,230.

(60) Provisional application No. 62/155,783, filed on May 1, 2015.

(51) Int. Cl.
| | |
|---|---|
| *G06F 17/30* | (2006.01) |
| *G06F 16/93* | (2019.01) |
| *G06F 3/0484* | (2013.01) |
| *G06F 16/248* | (2019.01) |
| *G06F 16/901* | (2019.01) |
| *G06F 16/2457* | (2019.01) |
| *G06Q 30/02* | (2012.01) |

(52) U.S. Cl.
CPC .......... *G06F 16/93* (2019.01); *G06F 3/04842* (2013.01); *G06F 16/248* (2019.01); *G06F 16/24578* (2019.01); *G06F 16/9024* (2019.01); *G06Q 30/0255* (2013.01)

(58) Field of Classification Search
CPC .................................................. G06F 16/9535
USPC .......................................... 707/E17.109, 726
See application file for complete search history.

(56) References Cited

U.S. PATENT DOCUMENTS

2002/0186867 A1* 12/2002 Gutta .................... G06F 16/40
382/116

OTHER PUBLICATIONS

"Office Action issued in European Patent Application No. 16724760.0" dated Feb. 11, 2019, 6 pages.

* cited by examiner

*Primary Examiner* — Baoquoc N To
(74) *Attorney, Agent, or Firm* — Christopher J. Volkmann; Kelly, Holt & Christenson, PLLC

(57) ABSTRACT

A computer system for dynamically surfacing related documents is provided. The computer system includes a processor that is a functional component of the computer system and is configured to execute instructions. The processor is operably coupled to a signal store having information indicative of a plurality of documents and relationships. A user interface component is coupled to the processor and is configured to receive a user selection of a first document. A dynamic suggestion component is configured to interact with the user interface component to receive an indication of the first document and access the signal store to provide a dynamic document suggestion based on relationships between other users and the plurality of documents in the signal store.

20 Claims, 13 Drawing Sheets

| FromContentId | ItemContentId | SignalType | Time Stamp |
|---|---|---|---|
| User1 | Doc2 | Viewed | 1/2/2014 |
| User1 | Doc3 | Viewed | 1/3/2014 |
| User1 | Doc1 | Modified | 1/1/2014 |
| User1 | Doc1 | Viewed | 2/1/2014 |
| User1 | Doc1 | Other | Any |
| User2 | Doc2 | Viewed | 1/2/2014 |
| User2 | Doc3 | Viewed | 1/3/2014 |
| User2 | Doc1 | Modified | 1/1/2014 |
| User3 | Doc1 | Viewed | 1/2/2014 |
| User3 | Doc2 | Modified | 1/3/2014 |
| User3 | other | Viewed | Any |
| Other | other | other | Any |

FIG. 4

| UserId | DocId | TimeStamp |
|--------|-------|-----------|
| User1  | Doc1  | 1/1/2014  |
| User1  | Doc1  | 2/1/2014  |
| User2  | Doc1  | 1/1/2014  |
| User3  | Doc1  | 1/2/2014  |
| User1  | Doc2  | 1/2/2014  |
| User2  | Doc2  | 1/2/2014  |
| User3  | Doc2  | 1/3/2014  |
| User1  | Doc3  | 1/3/2014  |
| User2  | Doc3  | 1/3/2014  |

FIG. 5

| UserId | DocId | TimeStamp |
|--------|-------|-----------|
| User1  | Doc1  | 1/1/2014  |
| User1  | Doc2  | 1/2/2014  |
| User1  | Doc3  | 1/3/2014  |
| User2  | Doc1  | 1/1/2014  |
| User2  | Doc2  | 1/2/2014  |
| User2  | Doc3  | 1/3/2014  |
| User3  | Doc2  | 1/2/2014  |
| User3  | Doc2  | 1/3/2014  |

FIG. 6

| UserID | DocId | Candidate | CandidateEarlier? |
|--------|-------|-----------|-------------------|
| User1  | Doc1  | Doc2      | FALSE             |
| User1  | Doc2  | Doc1      | TRUE              |
| User1  | Doc1  | Doc3      | FALSE             |
| User1  | Doc3  | Doc1      | TRUE              |
| User1  | Doc2  | Doc3      | FALSE             |
| User1  | Doc3  | Doc2      | TRUE              |
| User2  | Doc1  | Doc2      | FALSE             |
| User2  | Doc2  | Doc1      | TRUE              |
| User2  | Doc1  | Doc3      | FALSE             |
| User2  | Doc3  | Doc1      | TRUE              |
| User2  | Doc2  | Doc3      | FALSE             |
| User2  | Doc3  | Doc2      | TRUE              |
| User3  | Doc1  | Doc2      | FALSE             |
| User3  | Doc2  | Doc1      | TRUE              |

FIG. 7

| ID | EDGES | COMMENT |
|---|---|---|
| | Doc2|1000; | |
| Doc1 | Doc3|666 | Doc2: 3/3-0; Doc3: 2/3-0 |
| Doc2 | Doc3|666 | Doc3: 2/3-0 |

FIG. 8

DYNAMIC CONTENT SUGGESTION IN SPARSE TRAFFIC ENVIRONMENT

CROSS-REFERENCE TO RELATED APPLICATIONS

The present application is a continuation of and claims priority of U.S. patent application Ser. No. 14/836,520, filed Aug. 26, 2015, which is based on and claims the benefit of U.S. provisional patent application Ser. No. 62/155,783, filed May 1, 2015, the contents of which are hereby incorporated by reference in their entirety.

BACKGROUND

In many contexts, computers provide suggestions to users. This is helpful because the vast number of choices that a user may have may be virtually incomprehensible. For example, in an online shopping context, a user may purchase an item but be unaware that a second item is generally used in conjunction with the purchased item. However, a computer system receiving the purchase information of the first item can identify the second item as the most frequently-purchased item, by other users, when the first item is purchased. This information is helpful to the user in that he or she may have been totally unaware of the existence and/or necessity of the second item.

Online shopping systems, such as Amazon, and/or online content systems, such as Netflix, are able to analyze the activities of millions of users in order to improve or optimize purchasing events for a comparatively small set of products (i.e. movies). However, the approaches used for generating recommendations to users in such high traffic/small product set scenarios may not work effectively when the amount of user traffic is not plentiful and/or when the set of potential items to recommend is very large. Further, prior approaches may not work as effectively when the amount of traffic and/or the amount of items vary significantly.

The discussion above is merely provided for general background information and is not intended to be used as an aid in determining the scope of the claimed subject matter.

SUMMARY

A computer system for dynamically surfacing related documents is provided. The computer system includes a processor that is a functional component of the computer system and is configured to execute instructions. The processor is operably coupled to a signal store having information indicative of a plurality of documents and relationships. A user interface component is coupled to the processor and is configured to receive a user selection of a first document. A dynamic suggestion component is configured to interact with the user interface component to receive an indication of the first document and access the signal store to provide a dynamic document suggestion based on relationships between other users and the plurality of documents in the signal store.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 4 is a chart illustrating user/document signal information to be filtered in accordance with an embodiment described herein.

FIG. 5 is the chart of FIG. 4 filtered in accordance with one embodiment.

FIG. 6 is a result set indicating a reduction in filtered signals (by user, document) to a single record that includes a timestamp of the document discovery in accordance with one embodiment.

FIG. 7 is an example output table for building candidate documents sorted by user and document in accordance with one embodiment.

FIG. 8 is a table providing a ranked set of dynamic documents in accordance with one embodiment.

DETAILED DESCRIPTION

As set forth above, the approach used for generating recommendations to users in high traffic/small product set scenarios may not work effectively when the amount of user traffic is not plentiful and/or when the set of potential items to recommend is very large. One example of such an environment is in a corporate setting.

Typically, a corporation will employ thousands or tens of thousands of employees and generate millions of documents. Additionally in the corporate setting, all user activities are not necessarily equal. For example, the activities of a co-worker in the next office may be more relevant to a user's activities than those of a worker stationed in another country. Similarly, the activities of workers on the same team or division of a corporation may be of more relevance than those of workers on other teams. Additionally, in comparison to the number of potential documents generated and/or stored by the corporation the user activity can be considered sparse traffic. Thus, unlike a movie that may be rented by millions of viewers, a given document in a corporation may only be accessed (created, viewed, modified, etc.) relatively few times (i.e. 100 times).

In order to better model the enterprise environment, relatively new technology has been introduced that allows all objects of an enterprise to be modeled as nodes on a graph while all relationships between such objects can be modeled as edges or connections between nodes.

Figure 1:
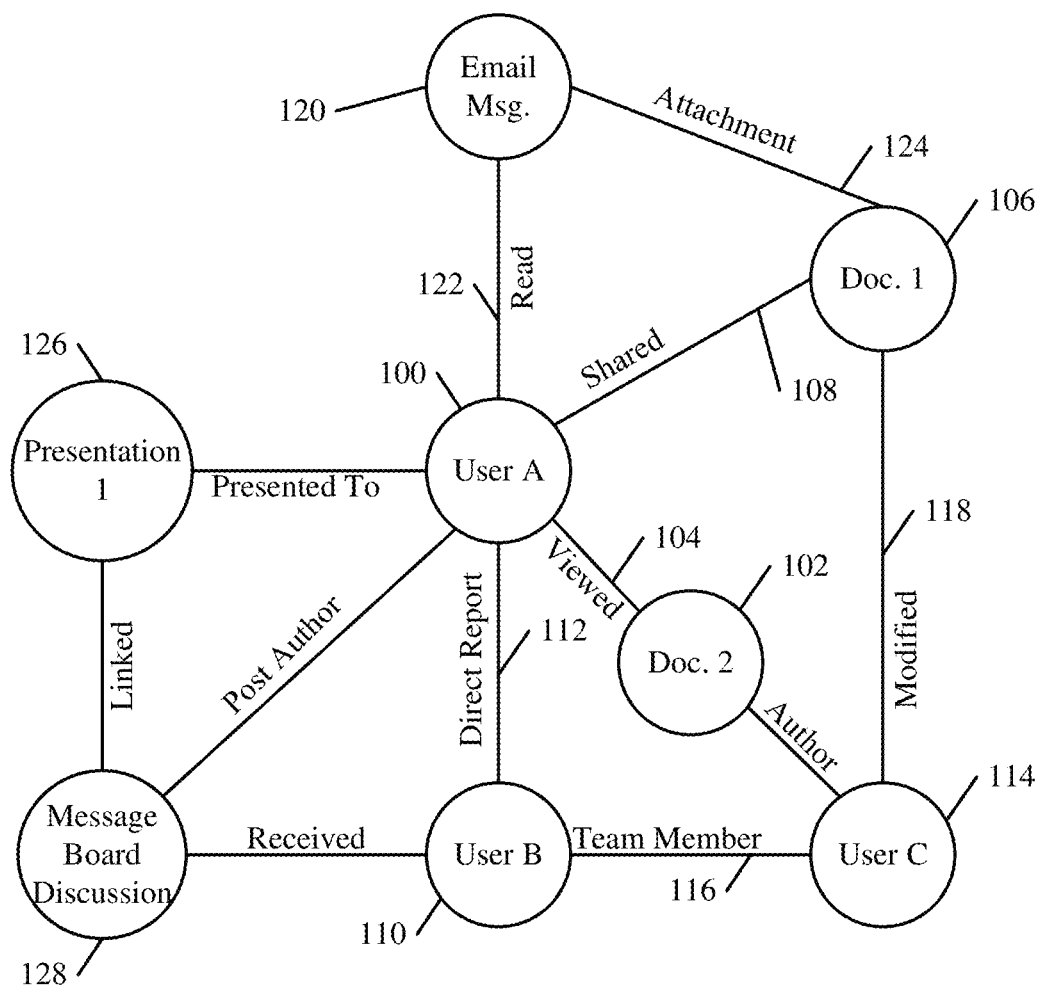
FIG. 1 is a diagrammatic graph representing a number of enterprise objects and relationships which are useful in providing dynamic content suggestion in accordance with embodiments described herein.

FIG. 1 is a diagrammatic view of an extremely simplified version of such a graph. In FIG. 1, User A is modeled at node 100. User A has viewed Document 2 (indicated at reference numeral 102). The fact that User A has viewed Document 2 is reflected in a relationship "viewed" as set forth at edge 104. In another example, Document 1 (indicated at reference numeral 106) has been shared with User A. This "shared" relationship is set forth at edge 108. Users may have relationships to each other. For example, in FIG. 1 User B, indicated at reference numeral 110, may have a relationship to User A. For example, User B may directly report to User A, as indicated at edge 112. Similarly, another user (User C—indicated at reference numeral 114) may be a team member with user B. This "team member" relationship is indicated at edge 116. Additionally, while Document 1 has been shared with User A, User C may have modified Document 1. This "modified" relationship between Document 1 and User C is indicated at edge 118. An additional corporate object is indicated at reference numeral 120. Node 120 reflects an email message. Email message 120 has been read by User A and thus is related to User A by virtue of the "read" relationship as indicated at edge 122. Further, message 120 also included Document 1 as an attachment. Accordingly, an edge 124 exists indicating that Document 1 is related to email message 120. Additional objects in the example of FIG. 1 are indicated at reference numeral 126, Presentation 1, and 128 (message board discussion). As can be appreciated, this object/relationship modeling of virtually every object in the enterprise allows the capture of significant relationship information. Moreover, as user activities occur, day-to-day, various new edges are created.

In accordance with embodiments described herein, when a user within the enterprise reads an article (such as a wiki page or blog post) it may be interesting for the user to know about other articles or documents on the related topic (more specific, more general, or similar) or documents that his/her close colleagues have read after reading this particular article. Further, an author of an article may also want to add other documents on a related topic to his/her article, so that readers will be able to discover all relevant information on the topic if they have further questions. Embodiments described herein generally provide efficient manipulation of the significant enterprise information captured in a node-edge graph to quickly filter information that allows the determination of conditional probability estimates based on a user's identification of a first document. Thus, the user's identification or selection of a first document can automatically surface dynamically-suggested related materials from within the enterprise.

Figure 2:
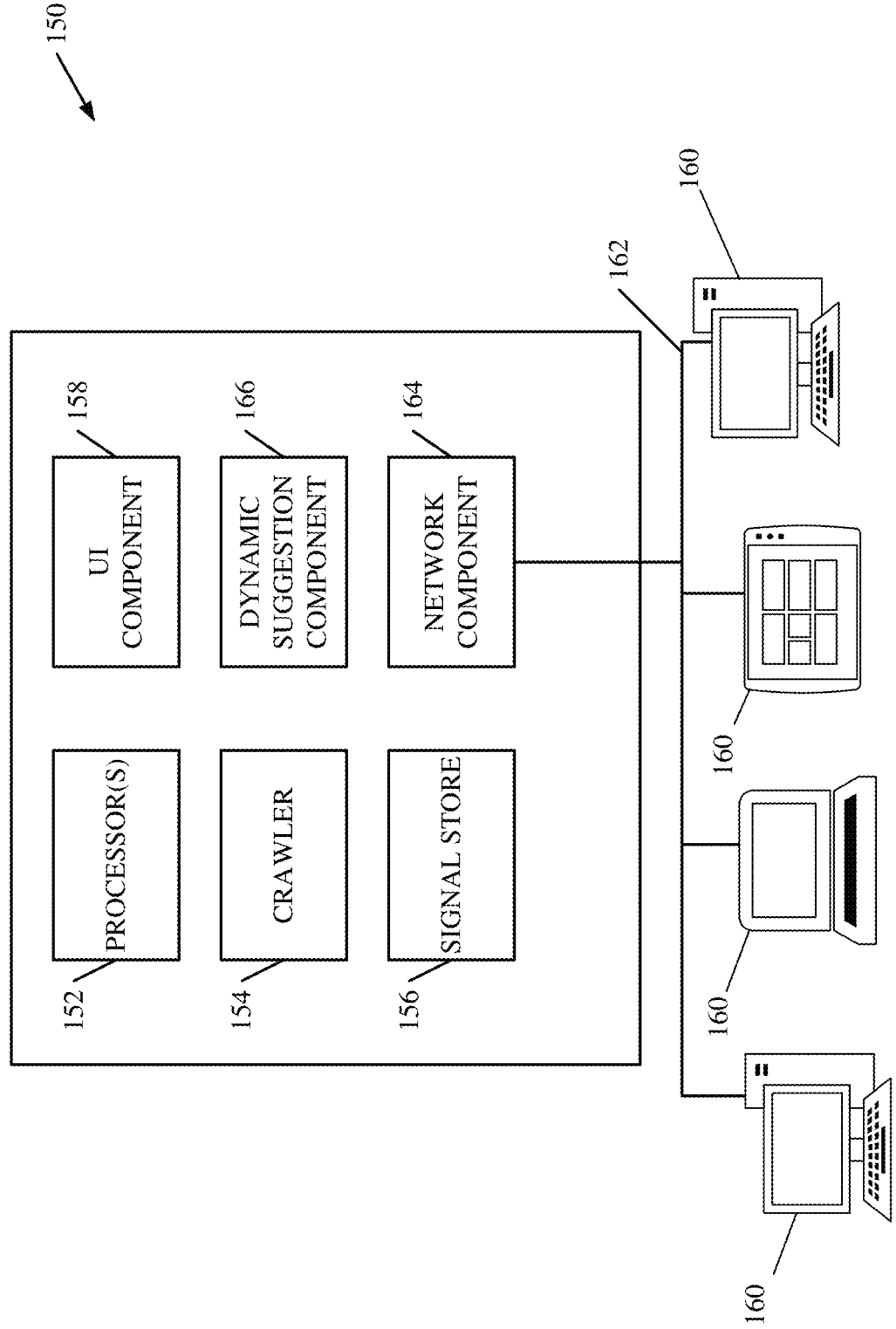
FIG. 2 is a block diagram of an exemplary computing system that provides dynamic content suggestion to users in a sparse traffic environment in accordance with one embodiment.

FIG. 2 is a diagrammatic view of a computing system for dynamically surfacing related documents in accordance with one embodiment. Computing system 150 includes one or more processors 152 that are each able to programmatically execute a sequence of instructions in order to perform one or more functions. Additionally, computing system also includes crawler component 154 that is configured to interact with the various objects stored within and/or for the enterprise in order to identify relationship material that may be suitable for modeling as edges in the node-edge graph. However, embodiments can be practiced where relationships are automatically depicted or otherwise indicated in a node-edge graph as the relationships are created. Computing system 150 also includes signal store 156. Signal store 156 is configured to store all of the information indicative of the various objects and relationships relative to the enterprise. Thus, in the context of a node-edge graph, signal store 156 stores all nodes and edges. However, embodiments can be practiced where other data structures can be employed in order to model the various interactions of the users with the objects of the enterprise.

Computing system 150 also includes UI component 158 that is configured to generate user interfaces to the various users interacting with system 150. UI component 158 may serve HTML information to one or more users using client devices 160 over network 162. In the enterprise environment, network 162 may be a local area network. However, network 162 may also include portions of a wide area network or may be entirely a wide area network.

In accordance with one embodiment, computing system 150 includes dynamic suggestion component 166 that is configured to identify a user selection of a first document via UI component 158 and interact with signal store 156 to identify one or more potential suggestion documents for the user based on the user's selection of the first document and other users' identification of documents after viewing the same document identified by the user. As set forth herein, a document includes any computer file containing information that is perceivable by a user. Thus, a document may be a word-processing document, a presentation, a picture file, a video file, etc.

Figure 3:
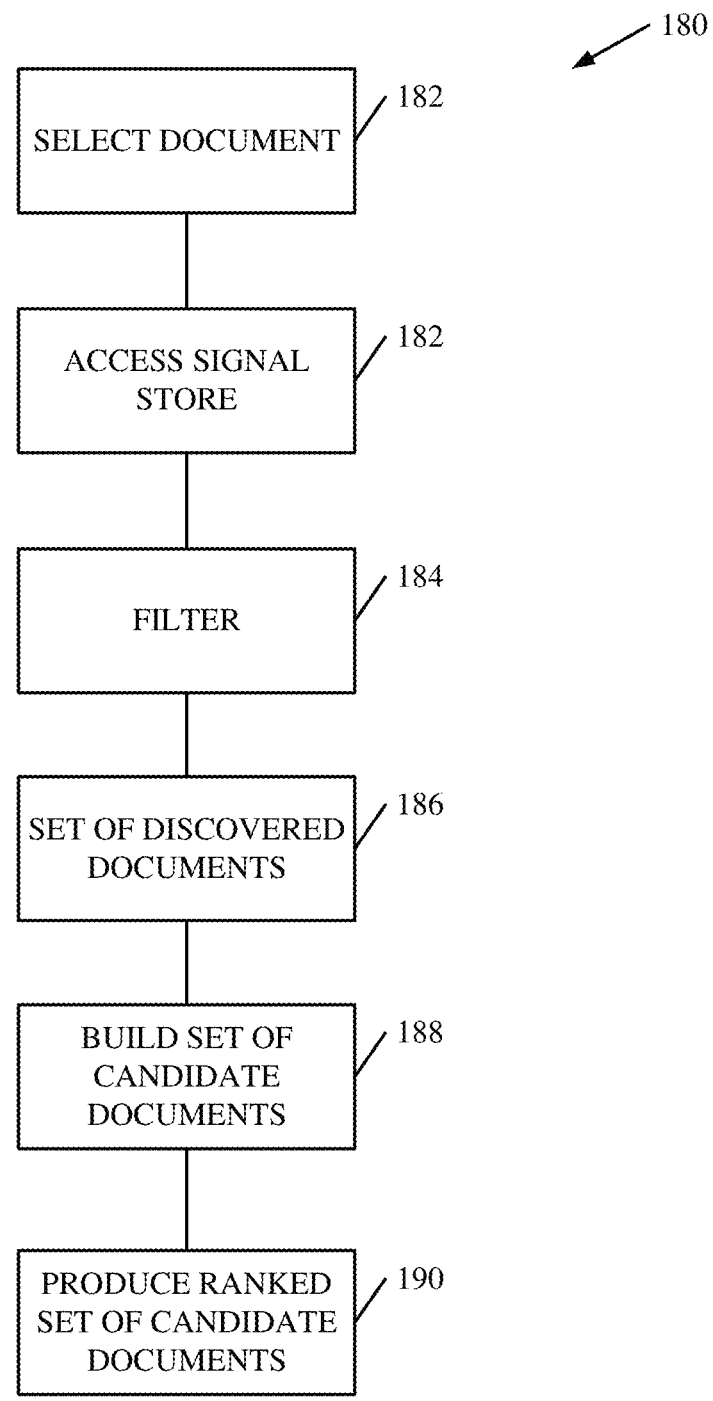
FIG. 3 is a flow diagram of a method of generating a set of candidate documents relative to an initial document in accordance with one embodiment.

FIG. 3 is a flow diagram of a method of providing a ranked set of candidate documents relative to a user's selection of a first document in accordance with one embodiment. Method 180 begins at block 182 where a user has selected a document. Next, at block 182, a dynamic suggestion component, such as component 166 (shown in FIG. 2) accesses a signal store, such as signal store 156, to obtain user/document usage information relative to the enterprise. As can be appreciated, even a relatively modest number of users interacting with a vast set of documents can generate significant information in the signal store. One example of such document usage information is set forth in the chart indicated in FIG. 4. In one embodiment, an input table is received from the signal store wherein the input table has a column for FromContentld (indicating a user) and ItemContentld, indicating a document. Next, a column is provided for a signal type, such as viewed, modified, other, etc. Finally, the last column indicates a timestamp when the particular signal was generated. Embodiments described herein generally seek to identify a set of documents ranked by the relative probability or likelihood of a user discovering a second document conditioned on the discovery of a first document. Embodiments described herein use that likelihood to rank the recommended documents. In this context, discovery implies viewing the document for the first time, as opposed to typical conditional transitions between documents.

Returning to FIG. 3, once the signal store information has been received, it is filtered, as indicated at block 184. In the illustrated example, the input table is first filtered by user. Thus, the table of FIG. 4 becomes the table shown in FIG. 5. Additionally, any signals that are not related to user discovery of a document are ignored. Thus, only viewed/modified signals are kept in the filter step of the illustrated example. Once the input signal information is filtered at block 184, control passes to block 186 where a set of discovered documents is computed. This step reduces the filtered signals by (user, document) to a single record that includes the timestamp of the document discovery. In one embodiment, this step also includes an optimization that discards any document that was not discovered by more than some threshold number of users, for example three users. Since this threshold-based discard process is done early in the process, it dramatically reduces the size of the candidate documents table, which has generally quadratic complexity.

Once the step of reducing the filtered signals is completed, the table shown in FIG. 5 is now reduced to that shown in FIG. 6. Returning to FIG. 3, at block 188, dynamic suggestion component 166 next builds a set of candidate documents based on the sorted table indicated in FIG. 6. For every document for a given user in the table shown in FIG. 6, each of the remaining documents are added to the record. The output table thus becomes that shown in FIG. 7. As can be seen, two additional columns are added; Candidate and CandidateEarlier. Since the techniques described herein are generally estimate the probability or likelihood of discovering a second document based upon the discovery of a first document, the priority or order of document discovery is important. The CandidateEarlier? column enables the tracking of this order. Here, CandidateEarlier?=FALSE means that the candidate document was not discovered before the original. This information is important in order to accurately compute the conditional probabilities later. In order to limit the size of the table shown in FIG. 7, certain restrictions can be enforced. Examples of such restrictions include the maximum number of documents per user (discarding users that access too many documents), maximum minutes between documents (discarding document pairs that are discovered, but separated by too much time, which would generally indicate that they are not related), maximum number of consecutive documents (discarding documents that are discovered after accessing more than n other documents).

Once the output table is generated, control passes to block 190 where the results are ranked according to conditional probabilities of a user identifying a document 1 based on first viewing document 2. In one example, this probability is estimated as follows:

$$P(\text{use}(doc_1) \mid \text{used}(doc_2) \wedge \neg \text{used}(doc_1)) = \frac{\text{seen}(doc_1) \cap \text{seen}(doc_2)}{\text{seen}(doc_2) \setminus \text{seenbefore}(doc_1, doc_2)}$$

Here, the condition on the left means that the second document ($doc_2$) was used before, but $doc_1$ was not used, meaning that $doc_1$ was discovered later. The fraction relates positive vs. all possible outcomes. All possible outcomes include number of times document 2 was seen, except when document 1 was seen before document 2, which would violate the order that is being enforced. The positive outcome would occur when both document 1 and document 2 are seen by some user. The length of the transition between document 2 and document 1 is ignored, in this example, which simplifies the computation. Certainly, embodiments can be practiced where a certain transition is enforced in the filtering, as set forth above.

The results of the conditional probability calculations are provided as a ranked set indicated in FIG. 8. The edges indicate the top candidate documents to be discovered after the document ID. In one embodiment, each edge contains the weight, which corresponds to the conditional probability of that particular document being discovered. Accordingly, in the example provided, for document 1, the top candidate for discovery is document 2. The second most probable discovery for document 1, after document 2, is document 3. Thus, if a user has selected document 1, a dynamic suggestion indicative of documents 2 and 3 can be provided to the user. The weight can be computed according to the following equation:

(1,000×usersSeenCandidateLater)/(totalUsersSeen-Document−users SeenCandidateEarlier).

The edges can then be added to the node-edge graph so that it is possible to retrieve the edges again given the source document.

It is believed that the techniques provided herein for filtering enterprise object usage information and computing conditional probabilities in order to provide dynamic suggestions to a user are more effective than other techniques.

Figure 9:
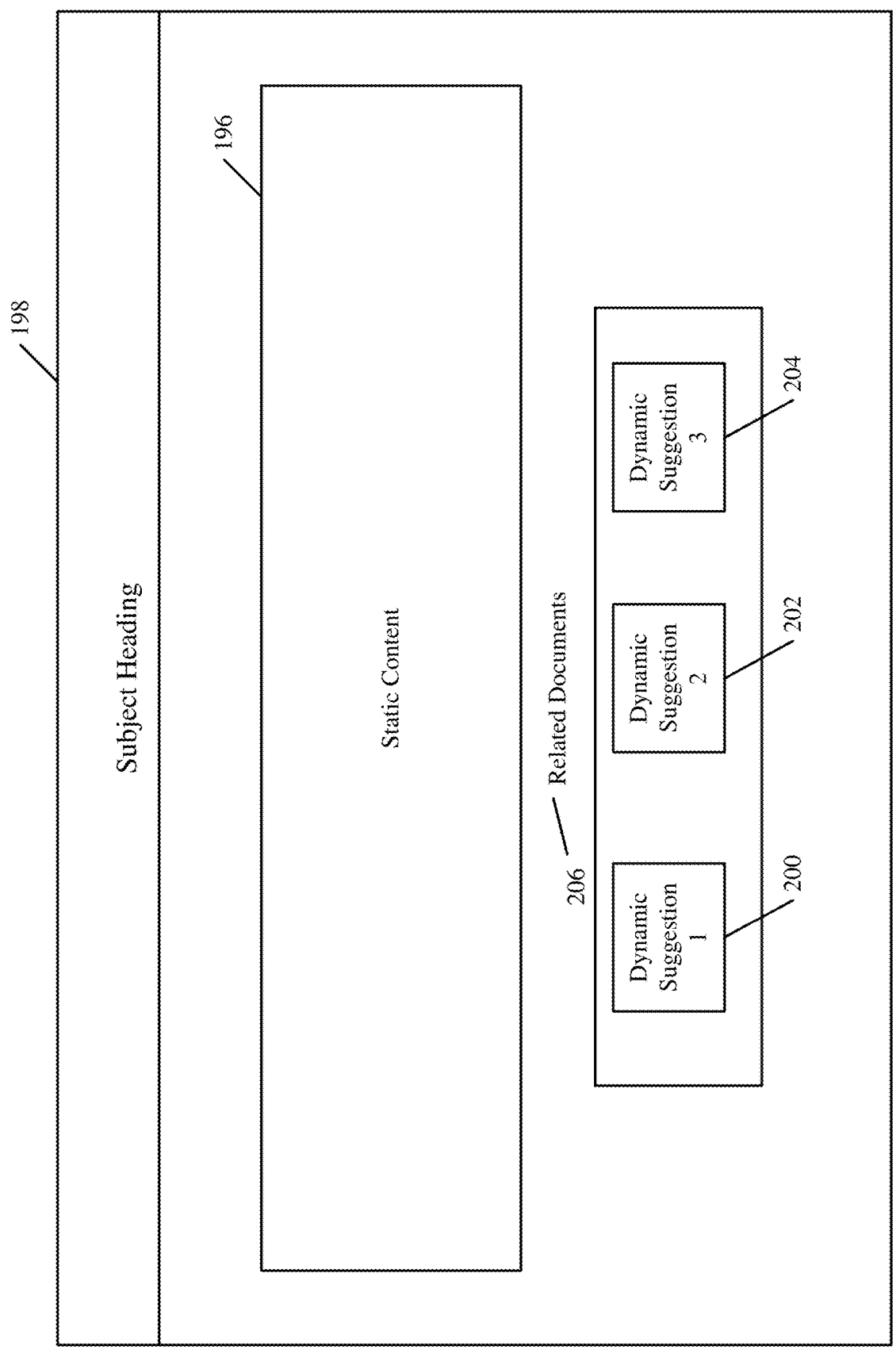
FIG. 9 is a diagrammatic user interface illustrating static content and one or more dynamically suggested documents produced in accordance with an embodiment herein.

FIG. 9 is a diagrammatic view of a user interface having user-selected or authored static content 196 embedded therein. When the user embeds static content 196 within the webpage or user interface 198 shown in FIG. 9, dynamic suggestion component 166 accesses signal store 156 and executes the method described with respect to FIG. 3. The result of this execution is the provision of a ranked set of documents 200, 202, and 204 that are provided as dynamic suggestions 1, 2, and 3, illustrated under the related documents heading 206. In this way, the computer system is automatically able to identify potentially relevant materials within the enterprise for the user, or other users, based on the selection of static content 196. Moreover, since embodiments described herein access a signal store that is updated in substantially real time, the dynamically-suggested materials may change as users interact with various documents within the enterprise. This helps ensure that fresh and relevant content will be provided to the users. Moreover, users are automatically provided with potentially interesting related materials without having to go searching through vast stores of documents within the enterprise.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 10:
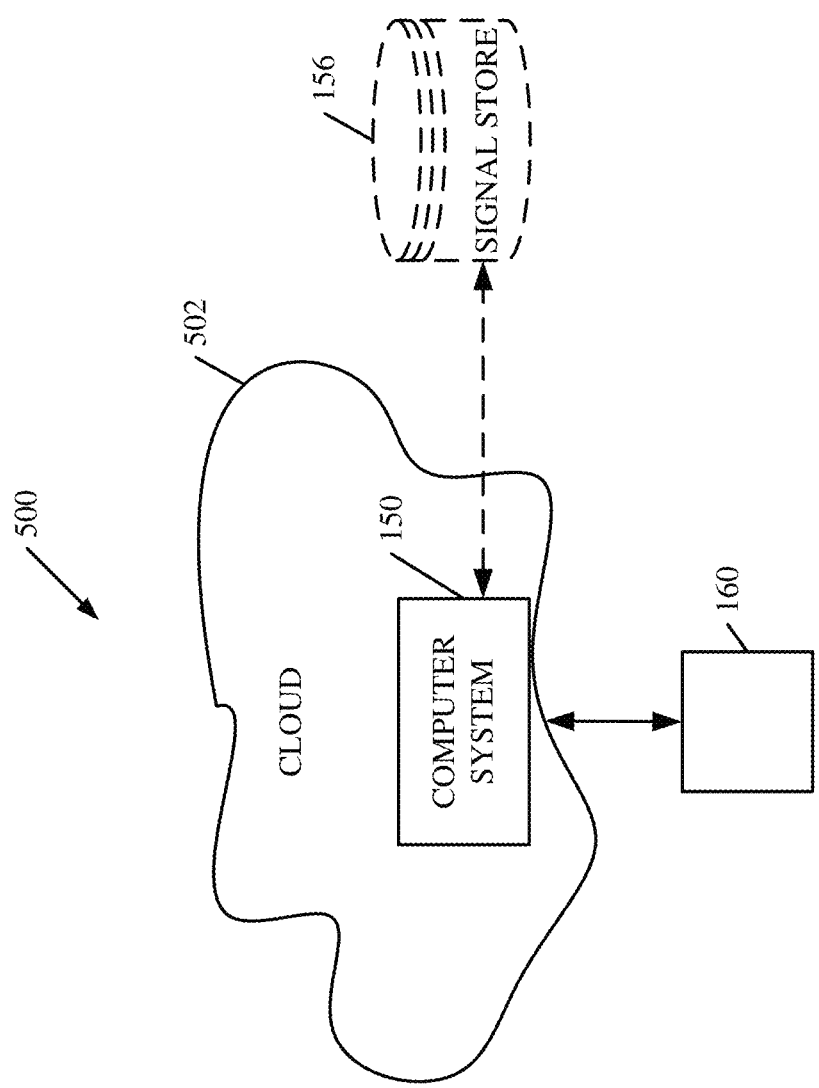
FIG. 10 is a block diagram of the architecture shown in FIG. 2, except that some of its elements are disposed in a cloud computing architecture.

FIG. 10 is a block diagram of the architecture shown in FIG. 2, except that some of its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 10, some items are similar to those shown in FIG. 2 and they are similarly numbered. FIG. 10 specifically shows that computer system 150 is located in cloud 502 (which can be public, private, or a combination where portions are public while others are private). Therefore, a user uses device 160 to access those systems through cloud 502.

FIG. 10 also depicts another embodiment of a cloud architecture. FIG. 10 shows that it is also contemplated that some elements of system 150 are disposed in cloud 502 while others are not. By way of example, signal store 156 can be disposed outside of cloud 502, and accessed through cloud 502. Regardless of where they are located, they can be accessed directly by device 160, through a network (either a wide area network or a local area network), they can be hosted at a remote site by a service, or they can be provided as a service through a cloud or accessed by a connection service that resides in the cloud. All of these architectures are contemplated herein.

It will also be noted that the architecture, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
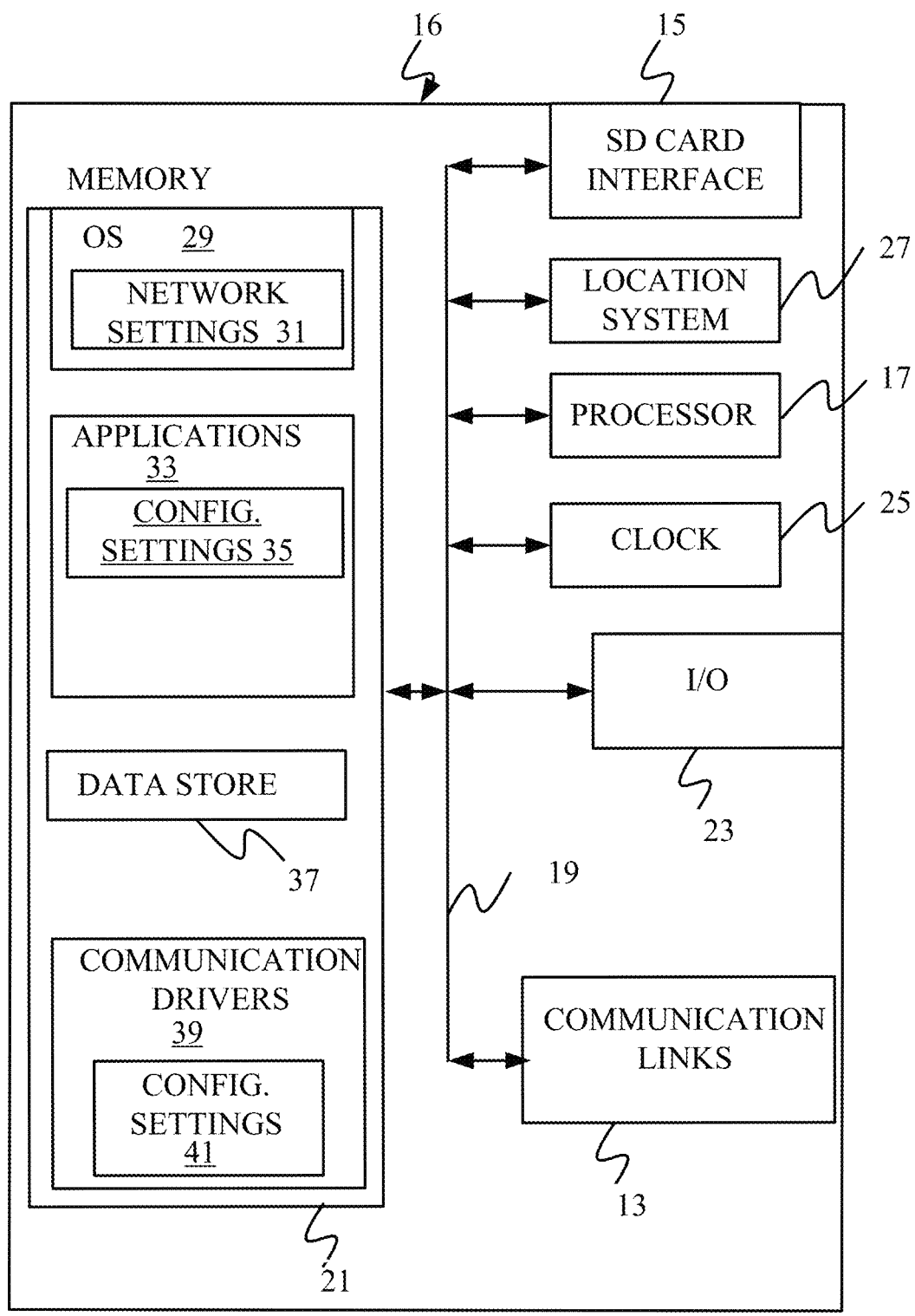
FIG. 11 is a simplified block diagram of one illustrative embodiment of a handheld or mobile computing device that can be used as a user's hand held device, in which the present system (or parts of it) can be deployed.

FIG. 11 is a simplified block diagram of one illustrative embodiment of a handheld or mobile computing device that can be used as a user's or client's hand held device 16, in which the present system (or parts of it) can be deployed. FIG. 11 provides a general block diagram of the components of a client device 16 that can run components of computer system 150 or that interacts with computer system 150, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or otherwise interact with system 150. For example, an application executing on device 16 may surface dynamic related content suggestions in accordance with embodiments described herein.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 12:
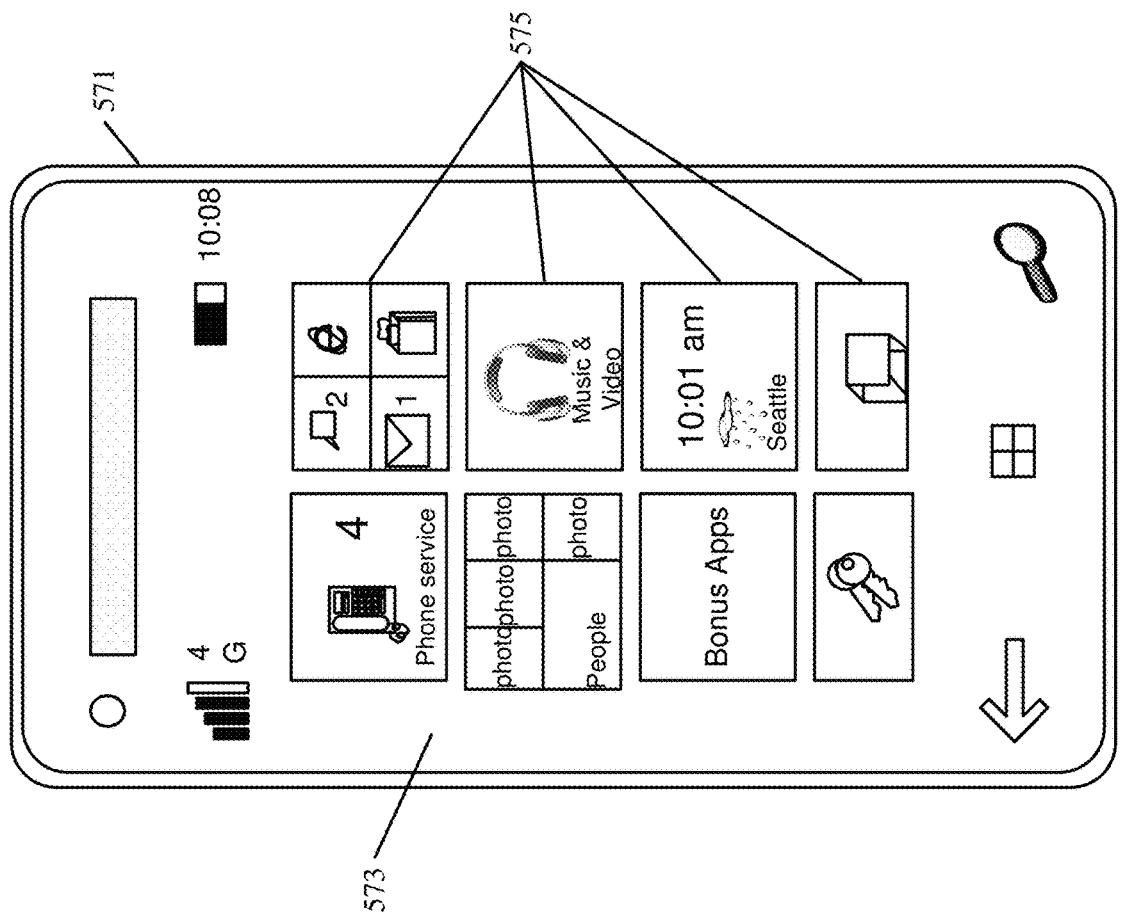
FIG. 12 is a diagrammatic view of a smart phone that can be used in accordance with embodiments described herein.

FIG. 12 is a diagrammatic view of a smart phone that can be used in accordance with embodiments described herein. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. Note that other forms of mobile device 16 are possible.

Figure 13:
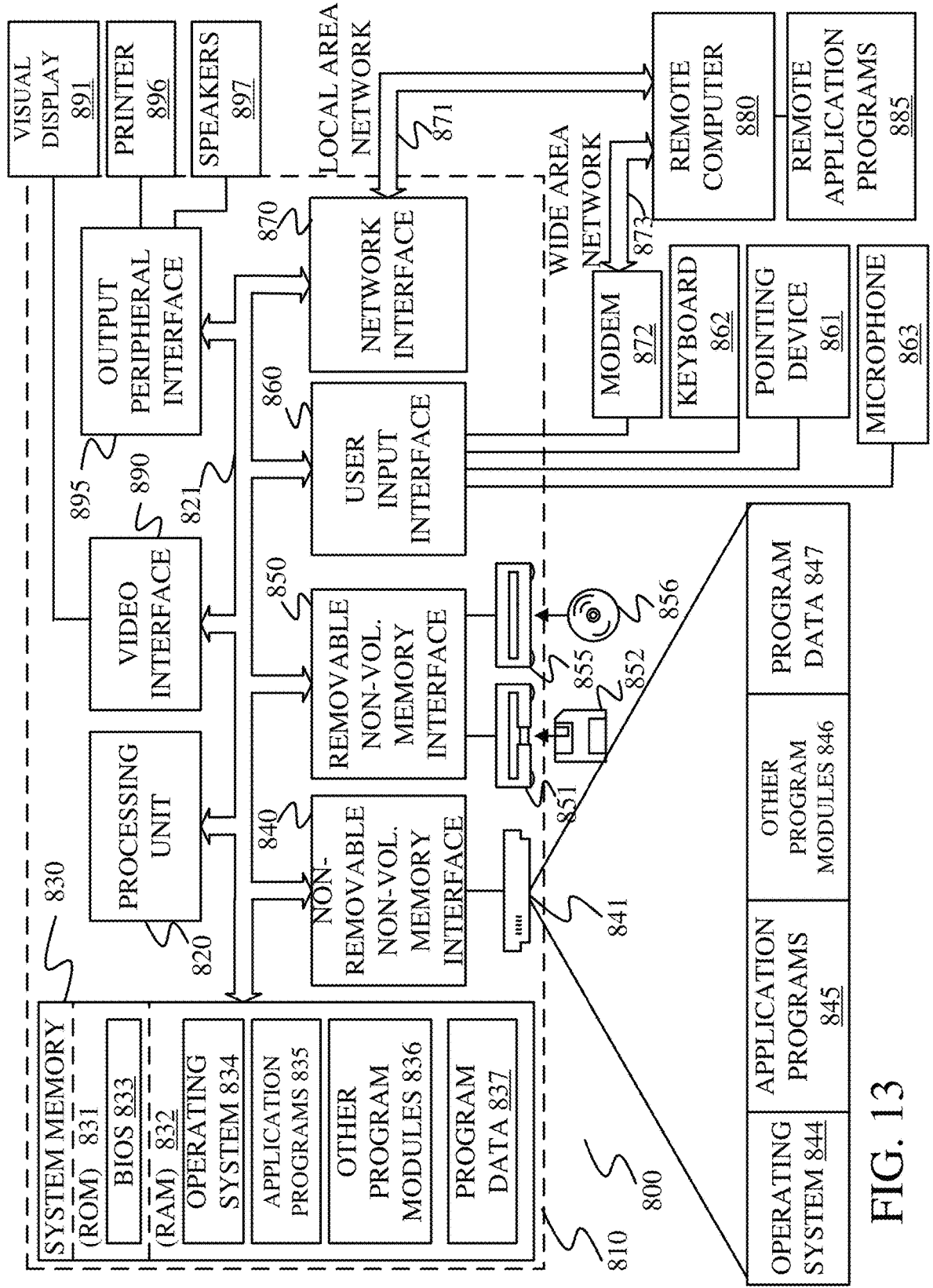
FIG. 13 illustrates one example of a computing environment in which embodiments described herein can be deployed.

FIG. 13 illustrates one example of a computing environment in which embodiments described herein can be deployed. With reference to FIG. 13, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computer system for dynamically surfacing related documents is provided. The computer system includes a processor that is a functional component of the computer system and is configured to execute instructions. The processor is operably coupled to a signal store having information indicative of a plurality of documents and relationships. A user interface component is coupled to the processor and is configured to receive a user selection of a first document. A dynamic suggestion component is configured to interact with the user interface component to receive an indication of the first document and access the signal store to provide a dynamic document suggestion based on relationships between other users and the plurality of documents in the signal store.

Example 2 is the computer system of any or all previous examples wherein the signal store is a component of the computer system.

Example 3 is the computer system of any or all previous examples wherein the dynamic document suggestion includes a plurality of documents.

Example 4 is the computer system of any or all previous examples wherein the plurality of documents are ranked based on conditional probability of a user discovering each respective document after discovering the first document.

Example 5 is the computer system of any or all previous examples wherein the dynamic suggestion component determines the conditional probability for each document based on other users' selections of respective documents after viewing the first document.

Example 6 is the computer system of any or all previous examples wherein the first document is a word processing file.

Example 7 is the computer system of any or all previous examples wherein the first document is a presentation file.

Example 8 is the computer system of any or all previous examples wherein the first document is an image file.

Example 9 is the computer system of any or all previous examples wherein the first document is a video file.

Example 10 is the computer system of any or all previous examples wherein the signal store includes a node-edge graph where documents are represented as nodes and relationships are represented as edges.

Example 11 is the computer system of any or all previous examples wherein the signal store is automatically updated in substantially real-time as users interact with documents.

Example 12 is the computer system of any or all previous examples and further comprising a crawler component configured to interact with documents to identify relationship information and store relationship information in the signal store.

Example 13 is a computer-implemented method for surfacing related documents. The method includes receiving a user selection of a first document and accessing a signal store having relationship information relative to a plurality of documents. At least one suggested document is provided based on conditional probability of discovering the at least one suggested document after discovering the selected first document.

Example 14 is the computer-implemented method of any or all previous examples wherein accessing the signal store includes receiving an input table from signal store where user information is related to each document along with signal type information.

Example 15 is the computer-implemented method of any or all previous examples and further comprising filtering the input table based on the signal type.

Example 16 is the computer-implemented method of any or all previous examples and further comprising discarding document from the input table that have not been discovered by a number of users above a selected threshold.

Example 17 is the computer-implemented method of any or all previous examples wherein a plurality of suggested documents are ranked by their conditional probability of discovery based on discovery of the first document.

Example 18 is the computer-implemented method of any or all previous examples and further comprising enforcing at least one restriction is enforced on the set of suggested documents.

Example 19 is the computer-implemented method of any or all previous examples wherein the restriction includes a maximum number of documents per user.

Example 20 is a computer system for dynamically surfacing related documents is provided. The computer system includes a processor that is a functional component of the computer system and is configured to execute instructions. The processor is operably coupled to a signal store having information indicative of a plurality of documents and relationships. A user interface component is coupled to the processor and is configured to receive user authored static content. A dynamic suggestion component is configured to interact with the user interface component to receive the user authored static content and access the signal store to dynamically suggest a plurality of related documents based on estimates of conditional probability of discovery of the related documents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
   at least one processor; and
   memory storing instructions executable by the processor, wherein the instructions, when executed, configure the computing system to:
   receive a user selection of a first document;
   access a first set of data records that is based on relationship information, relative to a plurality of documents, in a signal store,
   wherein each data record in the first set relates, to a corresponding document, user information and signal type information;
   generate a second set of data records by filtering the first set of data records based on signal type and omitting, from the second set, any data record that relates to a corresponding document that has not been discovered by a number of users above a threshold; and
   identify at least one suggested document relative to the first document based on the second set of data records.

2. The computing system of claim 1, wherein each data record in the second set of data records includes a timestamp and identifies a particular user and a particular document.

3. The computing system of claim 2, wherein the second set of data records is generated to include only a single record for each user/document pair, the single record including a time stamp that indicates a time when a particular user discovered a particular document.

4. The computing system of claim 2, wherein the at least one suggested document is identified based on a conditional probability of discovering the at least one suggested document after discovering the first document.

5. The computing system of claim 4, wherein the at least one suggested document, comprises a plurality of documents, and wherein the instructions configure the computing system to:
   rank the plurality of documents based on conditional probability of a user discovering each respective document after discovering the first document.

6. The computing system of claim 1, wherein the first set of data records comprises an input table and the second set of data records comprises an output table.

7. The computing system of claim 6, wherein the output table comprises a plurality of data records that each comprise:
   a first field that identifies a respective candidate document that was accessed by a particular user after the particular user accessed the first document; and
   a second field that indicates whether the respective candidate document was discovered by the particular user before the particular user discovered the first document.

8. The computing system of claim 1, wherein the signal store includes a node-edge graph where documents are represented as nodes and relationships are represented as edges.

9. The computing system of claim 1, wherein the signal store is automatically updated in substantially real-time as users interact with documents.

10. A method performed by a computing system, the method comprising:
    receiving a user selection of a first document;
    accessing a first set of data records that is based on relationship information, relative to a plurality of documents, in a signal store,
    wherein each data record in the first set relates, to a corresponding document, user information and signal type information;
    generating a second set of data records by filtering the first set of data records based on signal type and omitting, from the second set, any data record that relates to a corresponding document that has not been discovered by a number of users above a threshold; and
    identifying at least one suggested document relative to the first document based on the second set of data records.

11. The method of claim 10, wherein each data record in the second set of data records includes a timestamp and identifies a particular user and a particular document.

12. The method of claim 10, wherein the second set of data records is generated to include only a single record for each user/document pair, the single record including a timestamp that indicates a time when a particular user discovered a particular document.

13. The method of claim 11, wherein the at least one suggested document is identified based on a conditional probability of discovering the at least one suggested document after discovering the first document.

14. The method of claim 13, wherein the at least one suggested document comprises a plurality of documents, and further comprising:
    ranking the plurality of documents based on conditional probability of a user discovering each respective document after discovering the, first document.

15. The method of claim 10, wherein the first set of data records comprises an input table and the second set of data records comprises an output table.

16. The method of claim 15, wherein the output table comprises a plurality of data records that each comprises:
    a first field that identifies a respective candidate document that was accessed by a particular user after the particular user accessed the first document; and
    a second field that indicates whether the respective candidate document was discovered by the particular user before the particular user discovered the first document.

17. The method of claim 10, wherein the signal store includes a node-edge graph where documents are represented as nodes and relationships axe represented as edges.

18. The method of claim 10, wherein the signal store is automatically updated, in substantially real-time as users interact with documents.

19. A computing system comprising:
    at least one processor: and
    memory storing, instructions executable by the processor, wherein the instructions, when executed, configure the computing system to:
    receive a user selection of a first document;
    access a first set of data records that is based on relationship information, relative to a plurality of documents, in a signal store, wherein each data record in the first set relates, to a corresponding document, user information and signal type information;
    generate a second set of data records by filtering the first set of data records based on signal type and enforcing a restriction comprising at least one of:
    a maximum number of documents per user, a maximum time between documents, or a maximum number of consecutive documents: and based on the second set of data records, identify a plurality of suggested documents that are ranked based on a conditional probability of discovery of each suggest document based on discovery of the first document.

20. The computing system of claim 19, wherein the signal store includes a node-edge graph where documents are represented as nodes and relationships are represented as edges, and the signal store is automatically updated in substantially real-time as users interact with documents.

* * * * *